UNITED STATES PATENT OFFICE.

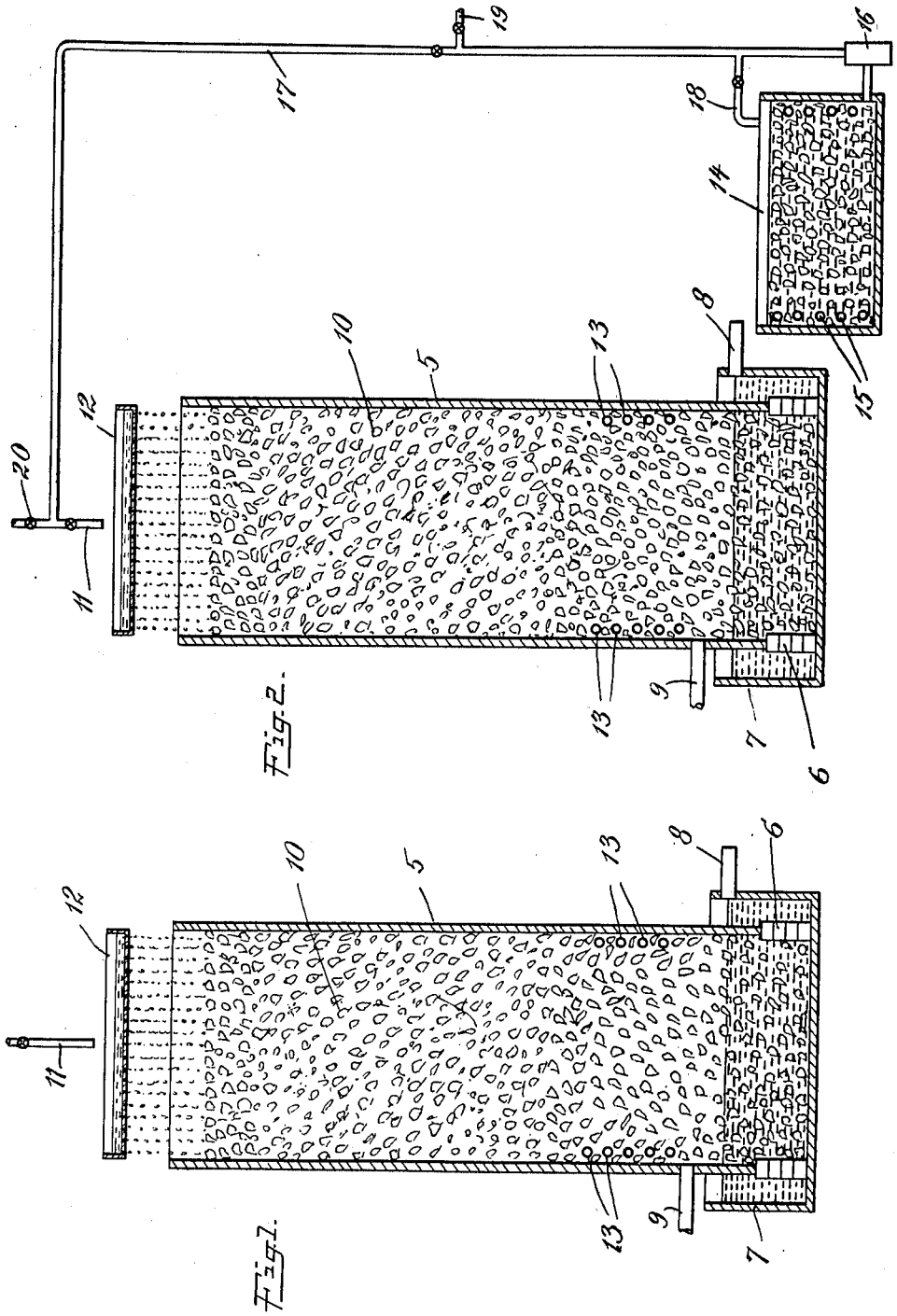

OLIVER WENDELL STOREY, OF MADISON, WISCONSIN, ASSIGNOR TO C. F. BURGESS LABORATORIES, A CORPORATION OF WISCONSIN.

MANUFACTURING OF ZINC CHLORID.

1,314,715.  Specification of Letters Patent.  Patented Sept. 2, 1919.

Application filed September 26, 1918. Serial No. 255,759.

*To all whom it may concern:*

Be it known that I, OLIVER W. STOREY, a citizen of the United States, residing at Madison, in the county of Dane, State of Wisconsin, have invented certain new and useful Improvements in Manufacturing of Zinc Chlorid; and I do hereby declare the following to be a full, clear, and exact description of the invention, such as will enable others skilled in the art to which it appertains to make and use the same.

This invention relates to the production of zinc chlorid, and has for its object the provision of an improved method of making zinc chlorid directly from zinc and chlorin.

Zinc chlorid is now generally prepared by dissolving zinc, zinc oxid, or zinc carbonate in hydrochloric acid. Text books state that zinc chlorid may be made by heating zinc in a current of chlorin, the zinc chlorid distilling over. This method, however, presents many practical difficulties, and as far as I know is not used commercially. Many attempts have been made to produce zinc chlorid by the direct action of chlorin on zinc, but I am not aware that any of these have proved successful.

The literature states that zinc is not attacked at atmospheric temperatures by dry chlorin. I have found, on the contrary, that dry chlorin does attack zinc at atmospheric temperatures with the formation of a film of zinc chlorid on the surface of the zinc. This film of zinc chlorid acts as a protective coating for the zinc and effectively prevents further action by the chlorin. When water vapor is present in or associated with the chlorin, the zinc is rapidly corroded by chlorin at atmospheric temperatures with the formation of zinc chlorid. I have found, however, that the formation of a highly concentrated zinc chlorid solution on the surface of the zinc acts as a protective coacting on the zinc and retards the action of chlorin on the surface so protected. I have discovered that further action by the chlorin on a zinc surface so protected may be secured by diluting the concentrated liquor or by removing it entirely.

When zinc is attacked by chlorin, a large amount of heat is generated. This reaction between zinc and chlorin liberates 97,400 calories per molecular weight of zinc chlorid in grams. Furthermore, the zinc chlorid going into solution in water liberates an additional 15,600 calories, thus giving a total of 113,000 calories of heat generated by the union of zinc and chlorin and the solution of the resulting zinc chlorid in water. This heat of reaction raises the temperature of the reacting materials so that a more rapid reaction is obtained. It also increases the solubility of the zinc chlorid in water and decreases the viscosity of the zinc chlorid solution so that it may be more readily removed from the surface of the zinc.

I have discovered that the affinity of chlorin for zinc, in the presence of water or water vapor, is so great that the reaction becomes rapid if the resulting zinc chlorid is diluted or removed instantaneously after its formation. My present invention, accordingly, contemplates the production of zinc chlorid by direct combination of zinc and chlorin in the presence of water or water vapor. In carrying out the invention in its preferred form, the resulting zinc chlorid is removed as rapidly as formed by immersing the zinc in water or by washing the zinc with water or water vapor, so as to prevent the formation of a protective coating of concentrated zinc chlorid solution on the surface of the zinc. To accomplish the dilution or removal of the zinc chlorid formed on the surface of the zinc, I make use of various methods and means, certain of which will now be briefly described in connection with the accompanying drawings.

Figure 1 in the accompanying drawing is a sectional elevation of an apparatus adapted for the practice of the invention; and Fig. 2 is a sectional elevation of a modified form of apparatus similarly adapted for the practice of the invention.

I have illustrated in Figs. 1 and 2 of the drawings two forms of apparatus adapted for the practice of the invention. It will, of course, be understood that other forms of apparatus may be employed for carrying out the invention, and I have selected these two forms of apparatus merely with the view of explaining the principles of the invention for the purposes of this specification.

In the apparatus of Fig. 1, chlorin is passed over zinc and an aqueous solution of zinc chlorid is allowed to trickle over the zinc in sufficient volume to secure the desired zinc chlorid concentration. The heat developed in the reaction is dissipated principally by the formation of steam in the reacting chamber. A cooling coil may be inserted in the reacting chamber to remove the heat of reaction.

As illustrated in the drawings, the apparatus of Fig. 1 comprises a tower 5, made of tile, vitreous brick, or other suitable material. The tower 5 rests on supports 6, of vitreous brick, or other suitable material, arranged on the base of a tank 7. This arrangement permits easy access to the bottom of the tower for cleaning purposes. The tank 7 has an overflow or outlet 8 near its top and at a point high enough to form a liquid seal for the bottom of the tower and low enough to keep the liquor level below the chlorin inlet 9 of the tower. The tower is filled with loosely packed zinc 10. Water is fed to the tower by means of a supply pipe 11, and is evenly distributed by means of a perforated distributing plate 12. The distributing plate is placed some distance above the top of the tower in order to allow the steam and inert gases to escape and also to permit of conveniently charging the tower at any time. Chlorin is supplied to the tower through the inlet 9 and passes upwardly through the loosely packed zinc. The chlorin thus flows in a direction counter-current to the liquor, consisting of an aqueous solution of zinc chlorid which passes downwardly through the tower to the tank 7 and out the overflow 8. After leaving the tank 7 through the overflow 8, the zinc chlorid solution may go to suitable purifying and settling tanks before being stored. The tower 5 may be provided with one or more cooling coils 13 for removing, to any desired or necessary extent, the heat of reaction.

In the apparatus of Fig. 2, chlorin is passed over zinc over which a heavy stream of water or zinc chlorid solution is continually running. The zinc chlorid is removed as fast as it is formed. The solution is recirculated over the zinc until the desired concentration is obtained. The reaction tower or chamber and its associated parts of the apparatus of Fig. 2 are similar to the corresponding elements of Fig. 1 and similar parts are designated by the same reference numerals in the two figures. After passing through the tower 5, the liquor overflows from the tank 7 into a tank 14 which is filled with zinc. The zinc in the tank 14 removes from the solution such soluble impurities as are electro-negative to zinc. A cooling coil 15 may be provided, if desired, or necessary, in the tank 14, for cooling the hot liquor coming from the tower 5. The liquor in the tank 14 is returned to the distributer 12 by means of a centrifugal or other suitable pump 16 and a pipe line 17. A by-pass 18 is provided from the pipe line 17 to the tank 14 for controlling the amount of circulating liquor, while an outlet 19 is provided for discharging the concentrated liquor to the settling and storage tanks. Fresh water may be supplied to the distributer 12 by opening the valve 20 of the pipe 11. In the normal operation of the apparatus of Fig. 2, the valve 20 is maintained closed.

I do not wish to confine myself by the term "zinc" to the pure metal, but intend this term to include the various impure commercial forms of zinc, such as scrap, spelter, galvanizer's dross and zinc alloys high in zinc. Such impure forms of zinc may be used advantageously in my process.

I have also found that impure chlorin may be used. All of the chlorin, even though diluted by other gases, is absorbed by the zinc, leaving the residual gas free from chlorin. These hot inert gases, when leaving the reacting chamber, help to remove some of the heat of reaction. The process of my present invention can therefore be used to remove chlorin from residual or tail gases low in chlorin.

In using chlorin gas made in electrolytic cells, I have found that it may be advantageous to dilute the gas with air. Chlorin gas so made often contains hydrogen in sufficiently large amounts to form an explosive mixture with chlorin at certain points in the apparatus, where the hydrogen percentage is increased by the utilization of the chlorin. By diluting the chlorin with sufficient air the danger from such explosions may be averted. The improved method of the invention does not require the application of external heat, since the reaction starts rapidly at atmospheric temperatures and increases in activity due to the heat of reaction. I have found that it is possible to obtain a sixty per cent. solution of zinc chlorid directly by the process of this invention. The reaction, however, is not as rapid at this high concentration as when the solution is dilute. The slower rate of reaction at this high concentration is partially overcome by running the apparatus at a higher temperature, that is, at the boiling point of water. The heat of reaction is sufficient to maintain this temperature without the application of external heat.

Commercial zinc and especially scrap contains as the principal impurities, iron, cadmium, copper, tin, lead and antimony. All of these metals are attacked by the chlorin in the presence of water and go into solution. All of these metals, except iron, may, however, be removed as such by passing the liquor over zinc, as described in connection with the apparatus of Fig. 2.

Since the chlorin and zinc unite directly and no hydrochloric acid is formed in the presence of water, I have found that an excess of the basic chlorid of zinc is formed over that which is necessary to precipitate as hydrate the iron usually found in zinc. In the practice of the invention, as herein described, I have accordingly found that the zinc chlorid is free from soluble iron, the iron having been entirely precipitated as the hydrate by the basic chlorid of zinc resulting from the union of zinc and chlorin in the presence of water.

The hydrate of iron thus precipitated by the basic chlorid of zinc may be separated from the zinc chlorid solution in any suitable manner, as for example by permitting the hydrate to settle in suitable settling tanks, from which the pure zinc chlorid solution may be withdrawn for storage or for further treatment.

After securing a fifty to sixty per cent. solution of zinc chlorid substantially free from impurities, by the procedure herein described, the solution may be evaporated until the fused chlorid is obtained. The fused chlorid so obtained is white in color and of a quality equal to that now produced by the usual commercial methods.

I claim:

1. The process of making zinc chlorid by the direct combination of zinc and chlorin in the presence of water; substantially as described.

2. The process of making zinc chlorid which comprises surrounding a metallic zinc body by an atmosphere of chlorin and bringing the resulting zinc chlorid formed into water solution by carrying out the process in the presence of water vapor; substantially as described.

3. The process of making zinc chlorid which comprises surrounding a metallic zinc body by an atmosphere of chlorin, and removing the zinc chlorid as rapidly as formed by immersing or washing the zinc with water or zinc chlorid solution; substantially as described.

4. The process of making a concentrated zinc chlorid solution which comprises subjecting zinc immersed in water to the action of chlorin until the desired concentration is obtained; substantially as described.

5. The process of making a concentrated zinc chlorid solution which comprises allowing enough water to flow over zinc surrounded by an atmosphere of chlorin to secure the desired concentration; substantially as described.

6. The process of making a concentrated zinc chlorid solution which comprises subjecting zinc to the action of chlorin, washing the resulting zinc chlorid from the zinc by a large excess of water, and recirculating the resulting liquor for the same purpose until a solution of the desired concentration is obtained; substantially as described.

7. The process of making a concentrated zinc chlorid solution which comprises subjecting zinc to the action of chlorin, washing the resulting zinc chlorid from the zinc by a large excess of water, cooling the resulting hot liquor, and recirculating and cooling the liquor continuously until a solution of the desired concentration is obtained; substantially as described.

8. The process of making zinc chlorid which comprises surrounding a metallic zinc body by an atmosphere of chlorin, and removing the resulting zinc chlorid as rapidly as formed by washing the zinc with water or zinc chlorid solution, the resulting zinc chlorid solution traveling in a direction opposite to that of the chlorin; substantially as described.

9. The process of making zinc chlorid which comprises surrounding a metallic zinc body by an atmosphere of chlorin and removing the zinc chlorid as rapidly as formed by washing the zinc with water or zinc chlorin solution, and controlling the amount of chlorin reacting with the zinc so that the temperature of the reacting mass shall be above the boiling point of the liquor; substantially as described.

10. The process of making zinc chlorid which comprises surrounding a metallic zinc body by an atmosphere of dilute chlorin, and removing the resulting zinc chlorid as rapidly as formed by washing the zinc with water or zinc chlorid solution; substantially as described.

11. The process of making zinc chlorid which comprises surrounding a metallic zinc body by an atmosphere of chlorin containing hydrogen, diluting the chlorin with sufficient inert gases to prevent the formation of an explosive mixture of hydrogen and chlorin, and removing the resulting zinc chlorid as rapidly as formed by washing the zinc with water or zinc chlorid solution; substantially as described.

12. The process of making zinc chlorid which comprises surrounding a metallic zinc body by an atmosphere of chlorin, removing the resulting zinc chlorid as rapidly as formed by washing the zinc with water or zinc chlorid solution, and removing the heat of reaction by circulating a cooling medium in the reacting mass; substantially as described.

13. The process of making concentrated zinc chlorid which comprises reacting upon a body of zinc with chlorin in the presence of water, and heating the resulting zinc chlorid solution until fused zinc chlorid is obtained; substantially as described.

14. The process of making zinc chlorid substantially free from soluble iron which comprises reacting upon zinc with chlorin in the presence of water with the formation of sufficient basic chlorid of zinc to precipitate as hydrate any iron present in the zinc; substantially as described.

15. The process of making zinc chlorid substantially free from soluble iron and other metals which comprises subjecting zinc to the action of chlorin in the presence of water so as to form zinc chlorid and sufficient basic chlorid of zinc to percipitate any iron present in the zinc, and subjecting the resulting zinc chlorid solution to the action of zinc; substantially as described.

16. The process of making zinc chlorid substantially free from soluble iron, iron hydrate and other insoluble solids, which comprises subjecting zinc to the direct action of chlorin in the presence of water, subjecting the resulting zinc chlorid solution to the action of zinc, and settling out the resulting iron hydrate and other insoluble solids; substantially as described.

In testimony whereof I affix my signature.

OLIVER WENDELL STOREY.